(12) United States Patent
Gao et al.

(10) Patent No.: US 12,021,449 B2
(45) Date of Patent: Jun. 25, 2024

(54) CONTROL CIRCUIT WITH HIGH POWER FACTOR AND AC/DC CONVERTER

(71) Applicant: SHANGHAI BRIGHT POWER SEMICONDUCTOR CO., LTD., Shanghai (CN)

(72) Inventors: Xiaoru Gao, Shanghai (CN); Shungen Sun, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 126 days.

(21) Appl. No.: 17/702,353

(22) Filed: Mar. 23, 2022

(65) Prior Publication Data

US 2022/0216783 A1 Jul. 7, 2022

Related U.S. Application Data

(63) Continuation of application No. PCT/CN2020/117483, filed on Sep. 24, 2020.

(30) Foreign Application Priority Data

Sep. 24, 2019 (CN) .......................... 201910906868.0

(51) Int. Cl.
*H02M 1/42* (2007.01)
*H02M 1/15* (2006.01)
(Continued)

(52) U.S. Cl.
CPC ........... *H02M 1/4208* (2013.01); *H02M 1/15* (2013.01); *H02M 7/06* (2013.01); *H05B 45/20* (2020.01);
(Continued)

(58) Field of Classification Search
CPC ........ H02M 1/4208; H02M 1/15; H02M 7/06; H05B 45/20; H05B 45/355; H05B 45/36; H05B 45/3725; H05B 45/59
See application file for complete search history.

(56) References Cited

U.S. PATENT DOCUMENTS

| 8,432,713 | B2 | 4/2013 | Popescu et al. | |
| 2012/0286663 | A1* | 11/2012 | Puvanakijjakorn | H05B 45/355 |
| | | | | 315/85 |
| 2012/0319604 | A1* | 12/2012 | Walters ................ | H05B 45/327 |
| | | | | 363/126 |

FOREIGN PATENT DOCUMENTS

| CN | 103036427 A | 4/2013 |
| CN | 103280965 A | 9/2013 |

(Continued)

*Primary Examiner* — Metasebia T Retebo
(74) *Attorney, Agent, or Firm* — MUNCY, GEISSLER, OLDS & LOWE, P.C.

(57) ABSTRACT

A high power factor control circuit is disclosed, which is used in an AC/DC converter. The converter includes a rectification module, a conversion module and a load. The rectification module receives AC power and rectifies it into a DC current, and the conversion module converts the DC current to drive power as desired by the load and provides it to the load. The conversion module includes a conversion element including an inductive element and a switching element. The control circuit includes a peak limiting signal generator and a switching element control module. The peak limiting signal generator receives a reference signal and produces at least one peak limiting signal from a sample signal. The switching element control module is configured to control switching of the switching element so that, within at least half a line-frequency period, a value of the ripple in the output current flowing through the load is not greater than a limit value.

19 Claims, 9 Drawing Sheets

(51) Int. Cl.
    *H02M 7/06*     (2006.01)
    *H05B 45/20*     (2020.01)
    *H05B 45/355*     (2020.01)
    *H05B 45/36*     (2020.01)
    *H05B 45/3725*     (2020.01)
    *H05B 45/59*     (2022.01)

(52) U.S. Cl.
    CPC ........... *H05B 45/355* (2020.01); *H05B 45/36* (2020.01); *H05B 45/3725* (2020.01); *H05B 45/59* (2022.01)

(56) References Cited

FOREIGN PATENT DOCUMENTS

| | | |
|---|---|---|
| CN | 103296904 A | 9/2013 |
| CN | 107426880 A | 12/2017 |
| CN | 110535337 A | 12/2019 |

* cited by examiner

CONTROL CIRCUIT WITH HIGH POWER FACTOR AND AC/DC CONVERTER

CROSS-REFERENCES TO RELATED APPLICATION

This application is a continuation of International Patent Application No. PCT/CN2020/117483, filed on Sep. 24, 2020, entitled "CONTROL CIRCUIT WITH HIGH POWER FACTOR AND AC/DC CONVERSION CIRCUIT", and the entire disclosure of which is incorporated herein.

TECHNICAL FIELD

The present invention relates to control circuits and AC/DC converters, and more particularly to a high power factor control circuit and AC/DC converter.

BACKGROUND

A single stage light-emitting diode (LED) controller with power factor correction that has the advantages of a good power factor, satisfactory harmonic current control, a streamlined circuit architecture and high cost effectiveness. However, despite the high power factor of such LED controllers, they tend to suffer from significant line frequency ripple in the output current due to a relative small DC bus capacitance and a bus voltage having the line frequency.

Figure 1:
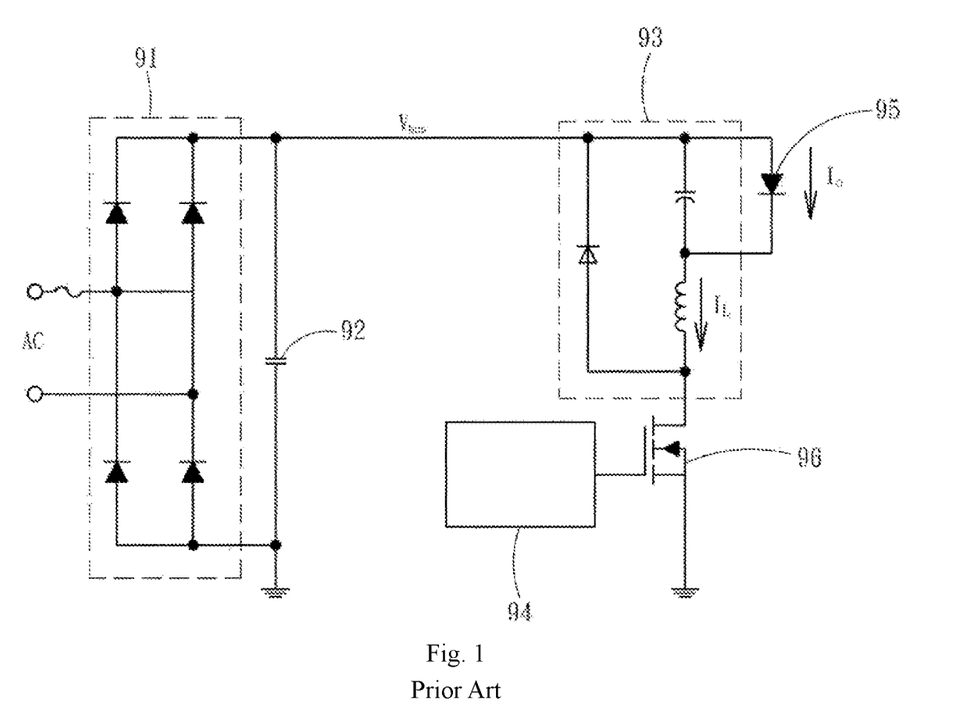
FIG. 1 shows a conventional LED control circuit.
Figure 2:
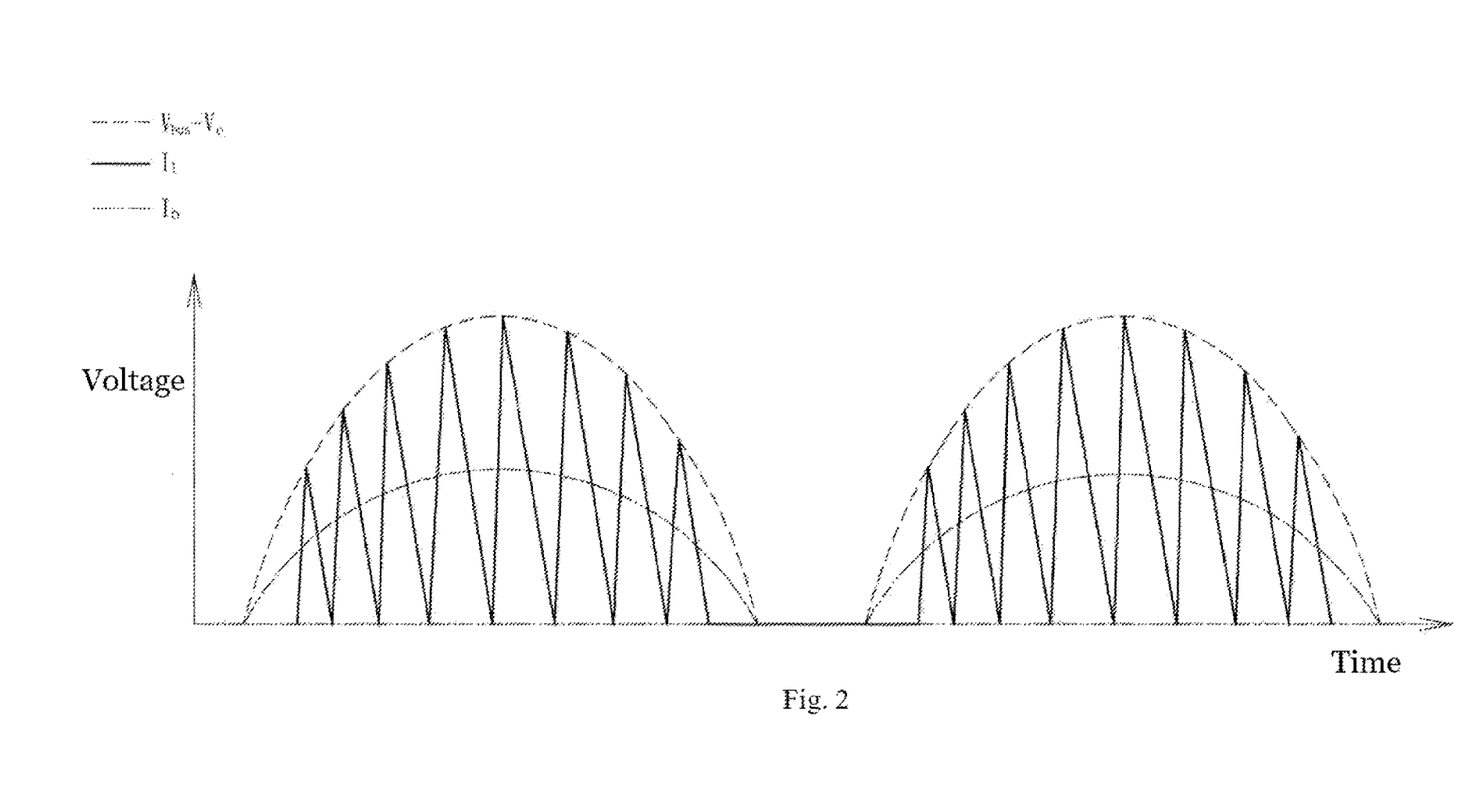
FIG. 2 schematically illustrates waveforms of an inductor current ($I_L$) and an output current ($I_O$) in a conventional LED control circuit.

FIG. 1 shows a conventional LED control circuit 90 including a bridge rectifier 91, a DC bus capacitor 92, a buck converter 93, a high power factor controller 94, a load 95 and a switching component 96. When receiving an AC mains supply, the bridge rectifier 91 produces a DC current, which flows into the DC bus capacitor 92, resulting in a bus voltage ($V_{bus}$). As previously mentioned, this bus voltage ($V_{bus}$) is a voltage having the line frequency. Waveforms of a current flowing through an inductive element ($I_L$) and an output current flowing through the load ($I_O$) in the buck converter 93 are shown in FIG. 2. The output current ($I_O$) is averaged from the inductor current ($I_L$), and the output current flowing through the load have ripple relative with the AC mains. A value of the ripple is positively correlated with a maximum peak value of the inductor current ($I_L$).

Ripple may not only shorten a service life of an affected component but may also become a reason for flickering of an LED. Therefore, for single stage LED controllers with power factor correction, it is important to control their ripple within a reasonable range.

SUMMARY OF THE INVENTION

It is a principal object of the present invention to solve the problem of excessive line frequency ripple with the conventional single stage LED controllers with power factor correction.

The above object is attained by a high power factor control circuit according to the present invention, which is used in an AC/DC converter. The AC/DC converter includes a rectification module, a conversion module coupled to the rectification module and a load driven by the conversion module. The rectification module is configured to receive AC power and to rectify it into a DC current. The conversion module is configured to convert the DC current to drive power as desired by the load and to provide it to the load and includes a conversion element and a switching element coupled to the conversion element. The conversion element includes an inductive element, and the switching element is configured to regulate a current flowing through the load, wherein the current flowing have ripple relative with the AC power. The control circuit includes: a peak limiting signal generator configured to receive a reference signal and a sample signal, the sample signal indicating the output current flowing through the load, and to output at least one peak limiting signal indicating a peak current according to the peak limiting signal and the sample signal; and a switching element control module coupled to the switching element, the switching element control module configured to control switching of the switching element based on the peak limiting signal so that, within at least half a line-frequency period, a value of the ripple in the output current flowing through load is not greater than a limit value.

According to one embodiment, the high power factor control circuit may further include a feedback unit, wherein the feedback unit may include: a sample circuit coupled to the switching element, the sample circuit configured to sample the output current though the load and to output the sample signal.

According to one embodiment, the feedback unit may include: a sampler circuit coupled to the switching element, the sampler circuit configured to sample the current though the inductive element and output a first sample signal; and a sample processor configured to generate the sample signal according to the first sample signal.

According to one embodiment, the peak limiting signal generator may further include a compensation module configured to produce a compensation signal from the reference signal and the sample signal.

According to one embodiment, the compensation module may include an error amplifier and a filter coupled to the error amplifier, the error amplifier configured to receive the reference signal and the sample signal, and to generate an error from the reference signal and the sample signal, the error being provided to the filter, the filter outputting the compensation signal.

According to one embodiment, the peak limiting signal generator may include a current limiting module configured to receive the compensation signal and to generate the peak limiting signal according to the compensation signal.

According to one embodiment, the switching element control module may further include a minimum OFF time generator configured to produce a minimum OFF time signal according to the compensation signal.

According to one embodiment, the current limiting module may include an amplifier and a resistor string, the amplifier including an output terminal, a first input terminal for receiving the compensation signal and a second input terminal coupled to the output terminal, the resistor string coupled to the output terminal and configured to output the peak limiting signal.

According to one embodiment, the current limiting module may include an amplifier and a resistor string, the amplifier including an output terminal, a first input terminal for receiving the compensation signal and a second input terminal coupled to the resistor string, wherein the peak limiting signal is output from a node between the output terminal of the amplifier and the resistor string.

According to one embodiment, the switching element control module may include a logic module and a driver coupled to the logic module, the logic module configured to produce a switching signal for controlling the switching element and to provide it to the driver.

According to one embodiment, the switching element control module may further include a delay configured to receive an ON signal and generate a first control signal for a constant-on-time mode of the AC/DC converter, the first control signal reflecting a maximum ON time for the switching element.

According to one embodiment, the switching element control module may further include a comparator configured to generate the second control signal based on a comparison of the peak limiting signal and the sensed signal.

According to one embodiment, the first and second control signals may determine an OFF control signal reflecting OFF timing for the switching element.

According to one embodiment, the switching element control module may further include a demagnetization detector including an input terminal coupled to the switching element and an output terminal configured to output a demagnetization signal to the logic module.

According to one embodiment, the high power factor control circuit may further include a dimming module configured to output the reference signal to the switching element control module, wherein the load is an LED lamp dimmed by the reference signal.

According to one embodiment, the peak limiting signal may vary with at least one factor selected from a group including the sample signal, the reference signal and the load.

The above object is also attained by a high power factor AC/DC converter, including: a rectification module configured to receive AC power and rectify it into a DC current; a conversion module coupled to the rectification module and configured to convert the DC current to drive power as desired by the load and provide it to the load, wherein the conversion module comprises a conversion element and a switching element coupled to the conversion element, the conversion element comprising an inductive element, the switching element configured to regulate a current flowing through the load, wherein the current flowing have ripples relative with the AC power; and a control module including: a peak limiting signal generator configured to receive a reference signal and a sample signal, the sample signal indicating the output current flowing through the load, and to output at least one peak limiting signal indicating a peak current according to the peak limiting signal and the sample signal; and a switching element control module coupled to the switching element, the switching element control module configured to control the switching element on and off, wherein the switching element control module controls the state of switching element according to the peak limiting signal and a sensed signal indicating a current flowing through the inductive element so that, within at least half a line-frequency period, a value of the ripple in the output current flowing through the load is not greater than a limit value.

According to one embodiment, the conversion module may be selected from a group consisting of a floating buck converter, a boost converter, a flyback converter and a buck-boost converter.

According to one embodiment, the load may be an LED lamp.

According to the present invention, the peak limiting signal produced from the sample signal varies with the sample signal, meaning that it depends on the luminous brightness, the bus voltage, the output voltage or the output current. In this way, both a peak current though the inductor and the peak threshold value of the current reflected by the sample signal vary over each line-frequency period, resulting in reduced ripple in the output current, which in turn extends the service life of any affected component and mitigates the LED's flickering issue.

DETAILED DESCRIPTION

The present invention will be described in detail below in connection with the accompanying drawings.

Figure 3:
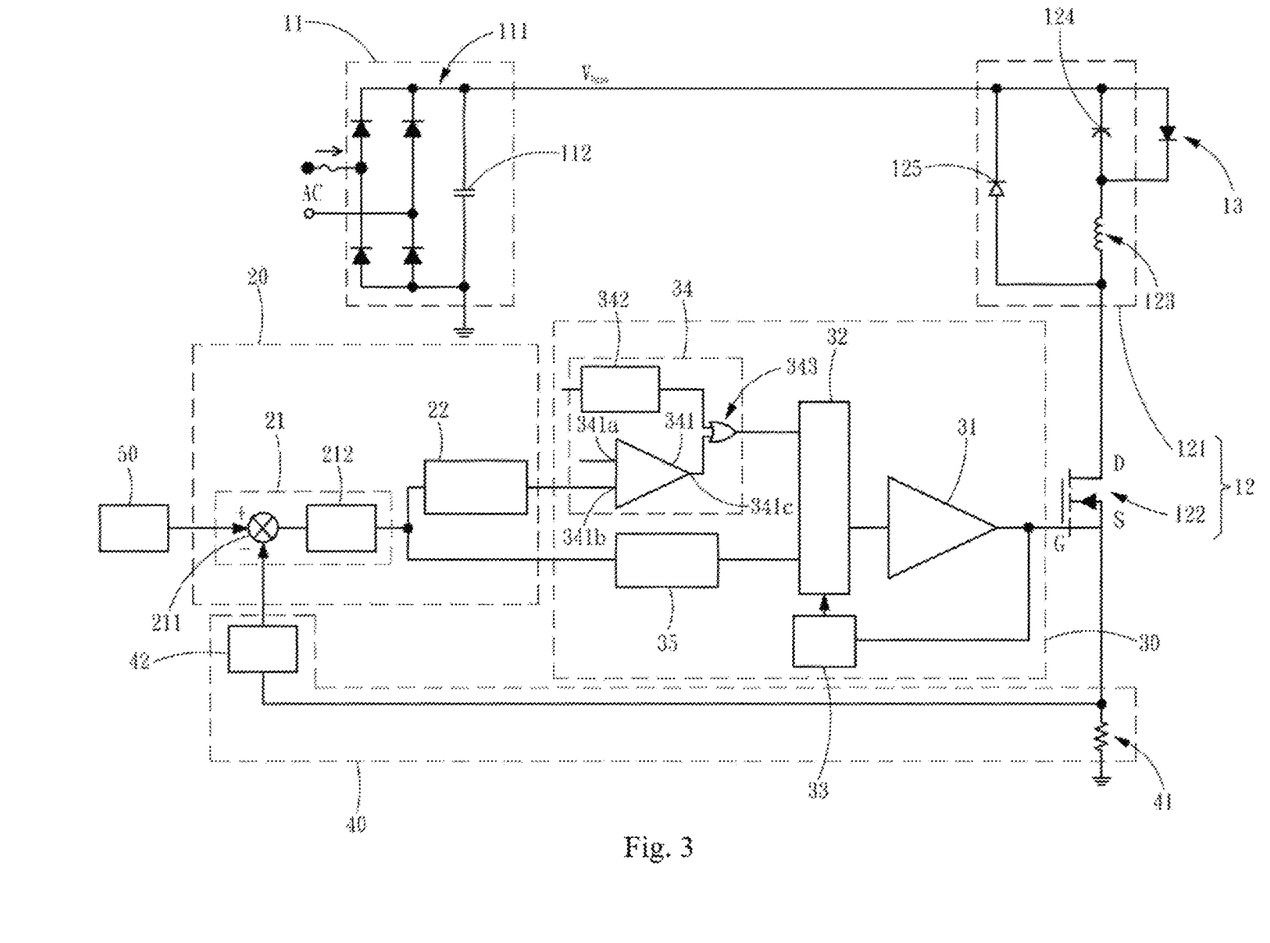
FIG. 3 is a schematic illustration of a high power factor control circuit according to another embodiment of the present invention.

The present invention discloses a high power factor control circuit and an AC/DC converter, the high power factor control circuit can be applied in the AC/DC converter. FIG. 3 is a schematic illustration of a high power factor control circuit according to a first embodiment of the present invention. The AC/DC converter includes a rectifier 11, a converter 12 and a load 13. The converter 12 is coupled to the rectifier 11 and is configured to drive the load 13. The rectifier 11 is configured to receive an alternating current AC and rectify it into a direct current DC. The rectifier 11 includes a rectifier 111 and a capacitor 112. The converter 12 is configured to convert the direct current DC to drive power as required by the load 13 and provide the drive power to the load 13. The converter 12 includes an inductive element 121 and a switching element 122. The inductive element 121 includes an inductor 123, a capacitor 124 and a diode 125. The switching element 122 may be a power switching device such as, without limitation, a metal-oxide-semiconductor field-effect transistor (MOSFET). Alternatively, the power switching device may be one or more triodes. The switching element 122 is configured to switch between an ON state and an OFF state. The switching element 122 includes a drain terminal D, a source terminal S and a gate terminal G. In this embodiment, the load 13 is an LED lamp.

The control circuit includes a peak limiting signal generator 20 and a switching element control module 30. The peak limiting signal generator 20 is configured to receive a reference signal and generate, from a sample signal from the switching element 122, at least one peak limiting signal. In this embodiment, the switching element control module 30 is coupled to the gate terminal G of the switching element 122. The switching element control module 30 is configured to control the switching element 122 on and off, wherein the switching element control module controls the state of switching element according to the peak limiting signal and a sensed signal indicating a current flowing through the inductive element so that, within at least half a line-frequency period, when a voltage on the inductor 123 is higher than a threshold, ripple in a current flowing through the inductor 123 is not greater than a limit value, which may vary with at least one factor selected from at least any of the sample signal, the reference signal and the load 13. In this embodiment, the control circuit further includes a feedback unit 40 and a dimming module 50. The feedback unit 40 is configured to sample a current though the inductor 123 and responsively output the sample signal. The feedback unit 40 may include a sampling resistor 41 and a sample processor 42. The sampling resistor 41 may be coupled to the switching element 122 and configured to sample the current though the inductor 123 and responsively output a first sample signal. The sample processor 42 may produce a second sample signal from the first sample signal and output it to the peak limiting signal generator 20. According to the present invention, the sample signal may be either the first sample signal or the second sample signal, depending on circumstances as appropriate. Further, the dimming module 50 may be controlled internally or externally to output the reference signal which may be considered as a dimming signal.

In this embodiment, the peak limiting signal generator 20 includes a compensation module 21 and a current limiting module 22. The compensation module 21 includes an error amplifier 211 and a filter 212, the filter 212 is coupled to the error amplifier 211. The error amplifier 211 is configured to receive the reference signal from the dimming module 50 and the sample signal, generate an error from the reference signal and the sample signal and provide the error to the filter 212. In this embodiment, the error amplifier 211 is configured to receive the reference signal and the second sample signal. The filter 212 is configured to output a compensation signal, which is then received by the current limiting module 22 that is coupled to the compensation module 21. The current limiting module 22 is configured to generate, according to the compensation signal, the peak limiting signal that reflects a voltage limit. According to the present invention, the filter 212 may be replaced with another circuit (e.g., a digital low-pass filter) or an analog low-pass filter, which is capable of filtering the error and outputting a DC current signal. For example, it may be provided by a combination of a transconductance amplifier and a capacitor.

The switching element control module 30 includes a driver 31, a logic module 32, a demagnetization detector 33, a first control module 34 and a second control module 35. The first control module 34 is coupled to the current limiting module 22 in the peak limiting signal generator 20. The first control module 34 includes a comparator 341, a delay 342 and an OR gate 343. The driver 31 is coupled to the gate terminal G of the switching element 122 and configured to switch on or off the switching element 122 based on a switching signal from the logic module 32. The first control module 34 is configured to produce an OFF control signal for controlling OFF timing (Turn-off timing) for the switching element 122, and the second control module 35 is configured to produce a minimum OFF time signal for setting a minimum OFF time (Turn-off duration) for the switching element 122.

The delay 342 is configured to receive the switching signal and generate a first control signal for a constant-on-time mode of the AC/DC converter, the first control signal reflecting a maximum ON time for the switching element 122. The first control signal is used to determine the OFF timing for the switching element 122. The comparator 341 has a first input terminal 341a, a second input terminal 341b and an output terminal 341c. The first input terminal 341a is configured to receive a sensed signal indicating a current flowing through the inductor. For example. The first input terminal 341a is configured to receive the first sample signal, and the second input terminal 341b is configured to receive the peak limiting signal from the current limiting module 22. The comparator 341 is configured to produce a second control signal from both the peak limiting signal and the first sample signal and output it at the output terminal 341c to the logic module 32. In other words, the comparator 341 determines, based on a comparison drawn between the peak limiting signal and the first sample signal, and outputs the second control signal that reflects a comparison result between the current sample signal (voltage or current) and a threshold limit (voltage or current limit), which is used to determine the OFF timing for the switching element 122. In this embodiment, current sample signal and the threshold limit are both voltages, and the first input terminal 341a is configured to receive the first sample signal. Accordingly, the comparator 341 is configured to produce, based on the peak limiting signal and the first sample signal, and output the second control signal. The first and second control signals are in turn fed to the OR gate 343, the OR gate 343 then produces the OFF control signal from the first and second control signals and provides it to the logic module 32. The OFF control signal determines the OFF timing for the switching element 122.

The second control module 35 is coupled to the compensation module 21 in the peak limiting signal generator 20. The second control module 35 may be implemented as a minimum OFF time generator, which is configured to produce, according to the compensation signal received from the compensation module 21, and provide, to the logic module 32, a third control signal reflecting the minimum OFF time for the switching element 122. That is, the third control signal provides the minimum OFF time signal. In other words, the third control signal is used to determine an ON time for the switching element 122. The demagnetization detector 33 is coupled between an output terminal of the logic module 32 and the driver 31. The demagnetization detector 33 has an input terminal and an output terminal. The demagnetization detector 33 is coupled to an output terminal of the driver 31 and configured to produce a demagnetization signal from an output from the driver 31 and provide the demagnetization signal to the logic module 32.

The logic module 32 is configured to receive the OFF control signal, the minimum OFF time signal and the demagnetization signal and to produce the switching signal therefrom, which is fed to the driver 31. As described above, the OFF control signal functions to switch off the switching element 122 when either of the following occurs (whichever is earlier): expiry of the maximum ON time for the switching element 122; and reaching of the threshold limit (voltage or current limit) by the current sample signal (voltage or current). On the other hand, the minimum OFF time signal functions to cause the switching element 122 to operate in a discontinuous conduction mode (DCM) in response to both a low luminous brightness and a short ON time.

Figure 4:
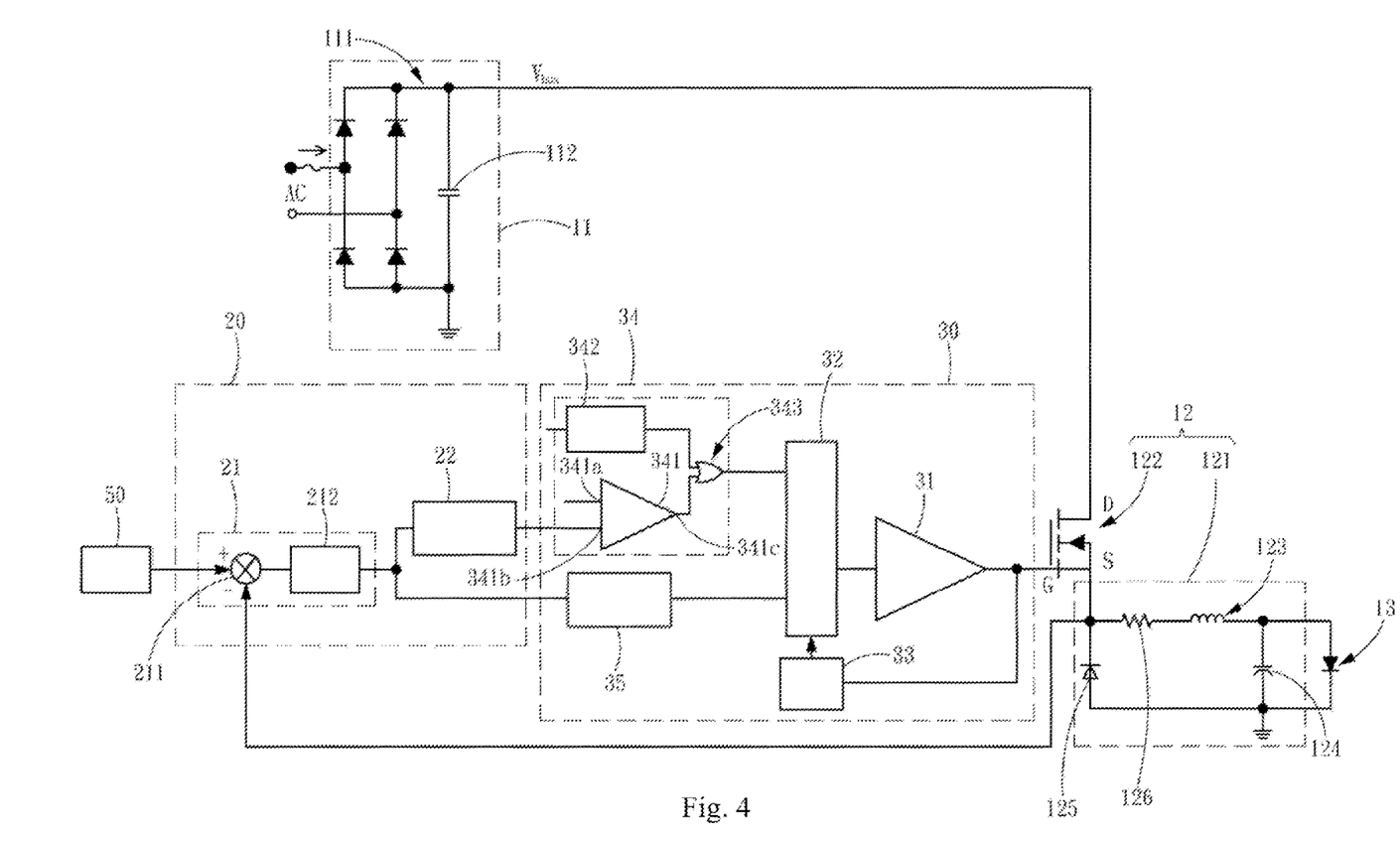
FIG. 4 is a schematic illustration of a high power factor control circuit according to another embodiment of the present invention.
Figure 5:
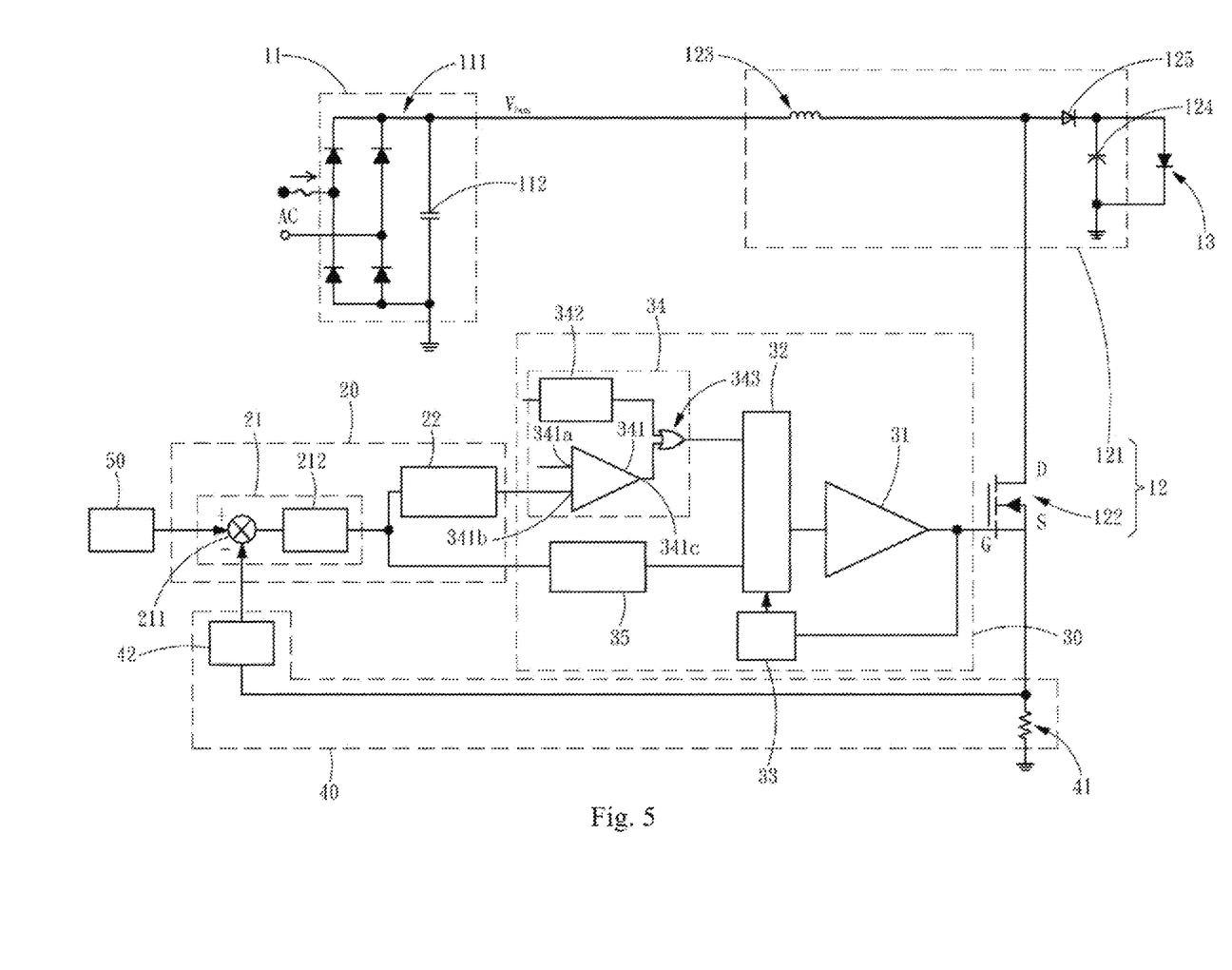
FIG. 5 is a schematic illustration of a high power factor control circuit according to another embodiment of the present invention.

According to the present invention, the converter 12 may be implemented as a floating buck converter, a boost converter, a flyback converter or a buck-boost converter, and specific circuit examples of some of these configurations will be explained below. FIG. 4 schematically shows a high power factor control circuit according to another embodiment of the present invention. In this embodiment, the converter 12 is implemented as a floating buck converter, with the switching element control module 30 being coupled to the gate terminal G of the switching element 122. The conversion element 121 includes an inductor 123, a capacitor 124, a diode 125 and a resistor 126. The capacitor 124, the diode 125 and the load 13 are connected in parallel, and the inductor 123 and the resistor 126 are connected in series between one end of the capacitor 124 and one end of the diode 125. The other end of the capacitor 124 is grounded. FIG. 5 schematically illustrates a high power factor control circuit according to another embodiment of the present invention. In this embodiment, the conversion module 12 is implemented as a boost converter, with the switching element control module 30 being coupled to the gate terminal G of the switching element 122. The conversion element 121 includes an inductor 123, a capacitor 124 and a diode 125. The capacitor 124 and the load 13 are connected in parallel, and the inductor 123 and the diode 125 are connected in series between the capacitor 124 and the capacitor 112. The drain terminal D of the switching element 122 is coupled between the inductor 123 and the diode 125.

Figure 6:
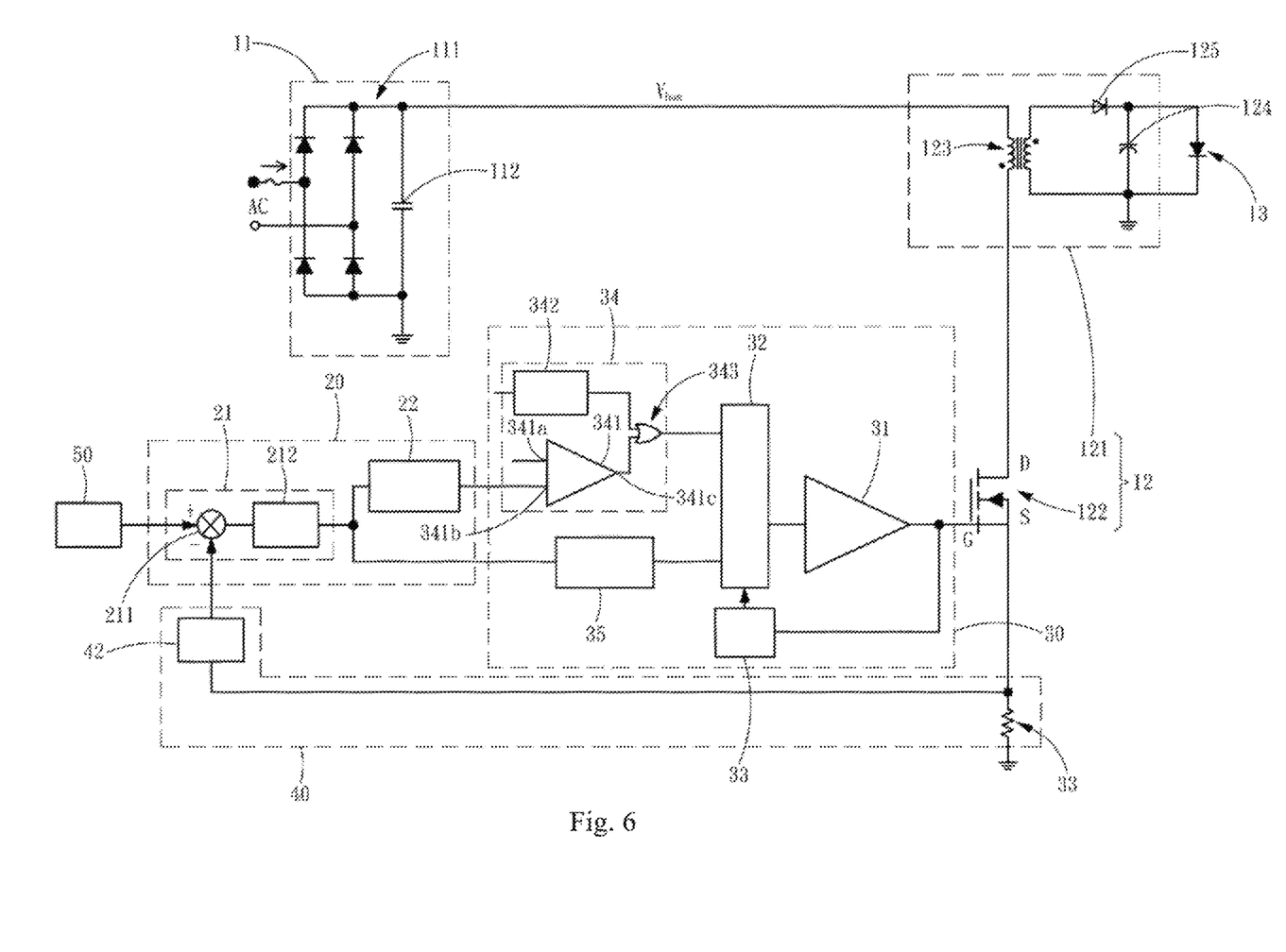
FIG. 6 is a schematic illustration of a high power factor control circuit according to another embodiment of the present invention.
Figure 7:
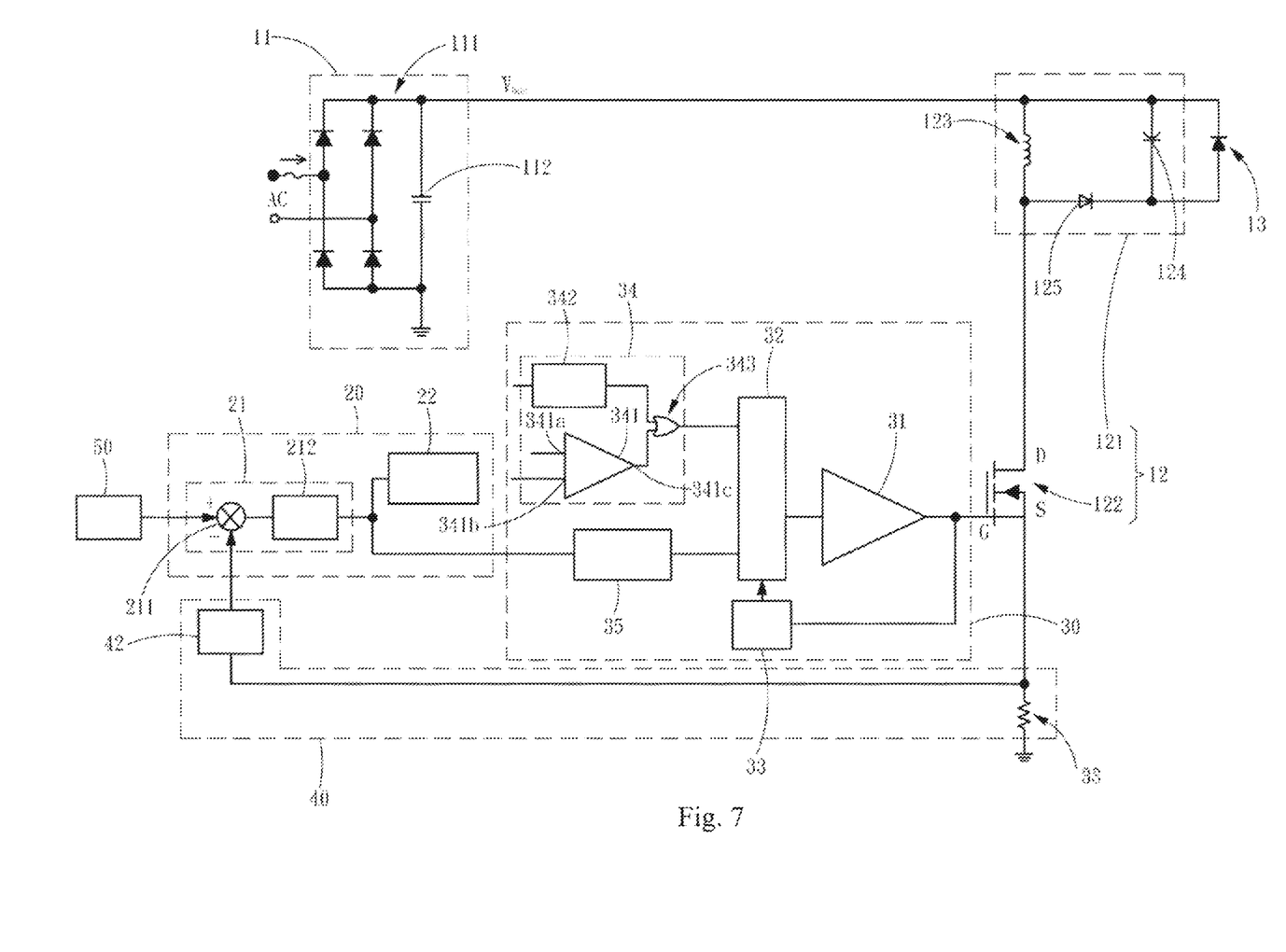
FIG. 7 is a schematic illustration of a high power factor control circuit according to another embodiment of the present invention.

FIG. 6 schematically illustrates a high power factor control circuit according to another embodiment of the present invention. In this embodiment, the conversion module 12 is implemented as a flyback converter, with the switching element control module 30 being coupled to the gate terminal G of the switching element 122. The conversion element 121 includes an inductor 123, a capacitor 124 and a diode 125. The capacitor 124 and the load 13 are connected in parallel, and the inductor 123 is a transformer having a first side and a second side. The first side is coupled to both the capacitor 112 and the drain terminal D of the switching element 122, and the second side is connected in parallel with the capacitor 124. The diode 125 is coupled to between the capacitor 124 and the second side. FIG. 7 schematically illustrates a high power factor control circuit according to another embodiment of the present invention. In this embodiment, the conversion module 12 is implemented as a buck-boost converter, with the switching element control module 30 being coupled to gate terminal G of the switching element 122. The conversion element 121 includes an inductor 123, a capacitor 124 and a diode 125. The inductor 123, the capacitor 124 and the load 13 are connected in parallel, and the diode 125 is coupled between the inductor 123 and the capacitor 124. The above configurations are merely exemplary, and in other embodiments of the present invention, other converter configurations are also possible.

Figure 8A:
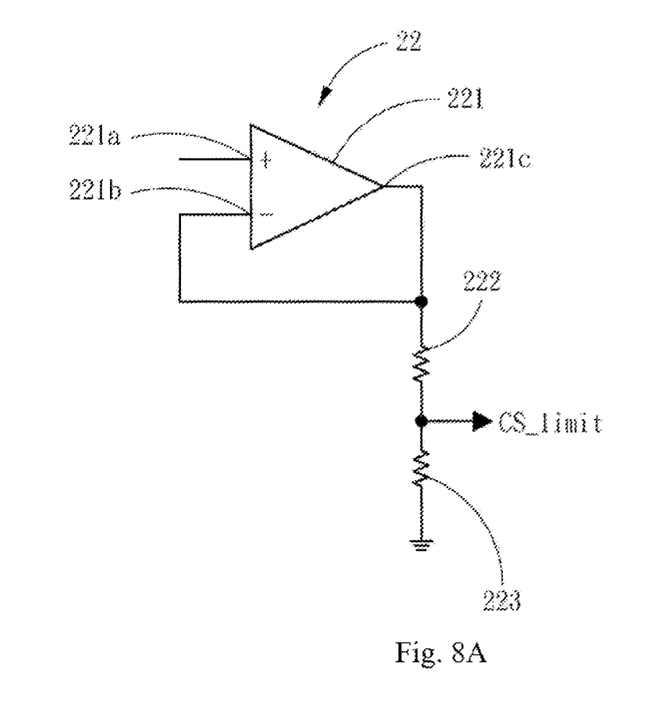
FIG. 8A schematically illustrates an arrangement of a current limiting module according to an embodiment of the present invention.
Figure 8B:
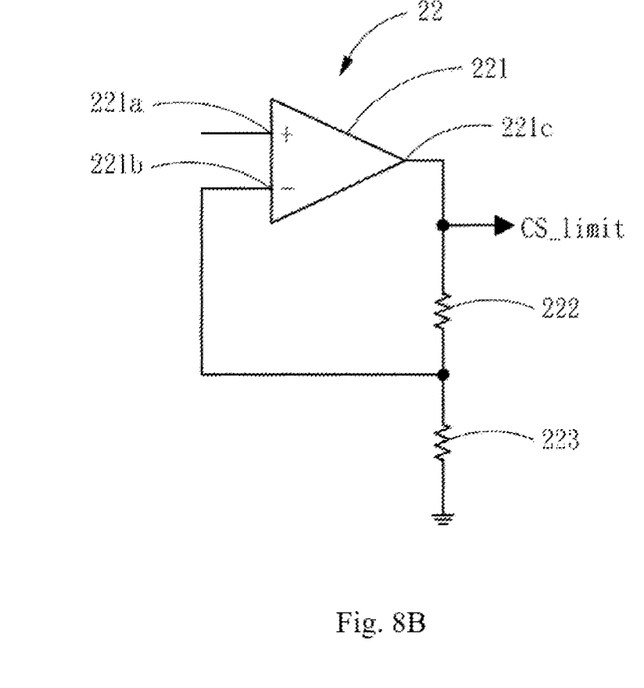
FIG. 8B schematically illustrates an arrangement of the current limiting module according to another embodiment of the present invention.

According to the present invention, the current limiting module 22 may be configured as shown in FIG. 8A to include an amplifier 221, a first resistor 222 and a second resistor 223. The amplifier 221 includes a first input terminal 221a, a second input terminal 221b and an output terminal 221c. The first input terminal 221a is configured to receive the compensation signal, and the second input terminal 221b is coupled to the output terminal 221c. One end of the first resistor 222 is coupled to the output terminal 221c of amplifier 221, and the other end is coupled to the second resistor 223 that is grounded. The peak limiting signal (CS_limit) is output from a node between the first resistor 222 and the second resistor 223. Alternatively, the current limiting module 22 may be configured as shown in FIG. 8B. In this configuration, an output from a node between the first resistor 222 and the second resistor 223 is fed to the second input terminal 221b, and the peak limiting signal (CS_limit) is output from a node between the output terminal 221c and the first resistor 222. The above configurations are merely exemplary, and in other embodiments of the present invention, other configurations of the current limiting module are also possible.

Figure 9:
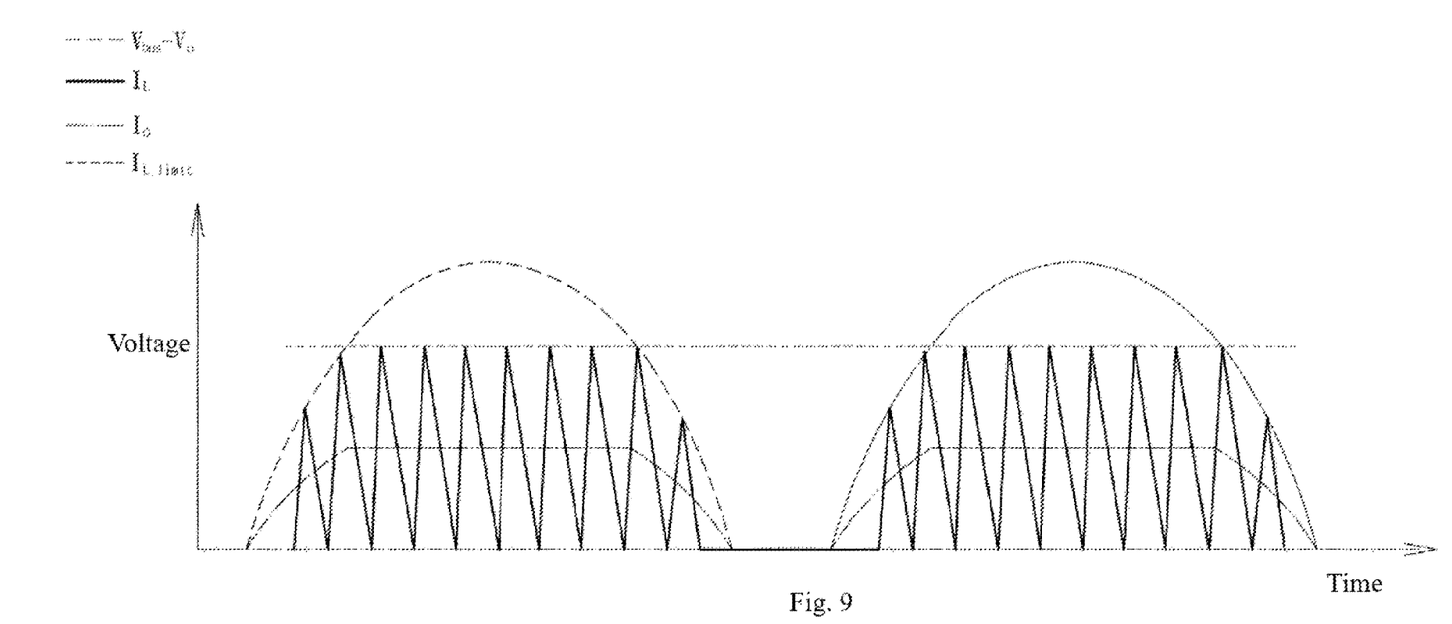
FIG. 9 schematically illustrates waveforms of an inductor current ($I_L$) and an output current ($I_O$) in a control circuit according to the present invention.

FIG. 9 schematically illustrates waveforms of a current flowing through an inductive element $(I_L)$ and an output current flowing through the load $(I_O)$ in a control circuit according to the present invention. Under the effect of the peak limiting signal produced by the peak limiting signal generator from the sample signal, as can be seen in FIG. 9, the current flowing through the inductor is limited within a peak threshold value (IL_limit), thereby reducing ripple in the current. Moreover, the minimum OFF time signal produced by the second control module can prevent an undesirable short ON time at low brightness, despite limiting the current within the peak threshold value (IL_limit).

Further, the peak limiting signal produced from the sample signal varies with the sample signal, meaning that it depends on the luminous brightness, the bus voltage, the output voltage or the output current. In this way, both a peak current though the inductor and the peak threshold value of the current reflected by the sample signal vary over each line-frequency period, resulting in reduced ripple in the output current, which in turn extends the service life of any affected component and mitigates the LED's flickering issue. Furthermore, the same amount of reduction in output current ripple can be achieved by a smaller output capacitor, resulting in a reduction in cost.

What is claimed is:

1. A high power factor control circuit used in an AC/DC converter, the AC/DC converter comprising a rectifier, a converter coupled to the rectifier and a load driven by the converter, the rectifier configured to receive AC power and to rectify the AC power into a DC current, the converter configured to convert the DC current to drive power as desired by the load and to provide the drive power to the load, wherein the converter comprises an inductive element and a switching element coupled to the inductive element, the switching element configured to regulate a current flowing through the load, wherein the current flowing have ripples relative with the AC power, the high power factor control circuit comprising:

a peak limiting signal generator configured to receive a reference signal and a sample signal, the sample signal indicating the current flowing through the load, and to output at least one peak limiting signal indicating a peak current according to the reference signal and the sample signal;

a switching element control module coupled to the switching element, the switching element control module configured to control the switching element on and off, wherein the switching element control module controls the state of switching element according to the peak limiting signal and a sensed signal indicating a current flowing through the inductive element so that, within at least half a line-frequency period, a value of the ripples in the current flowing through the load is not greater than a limit value; and a feedback unit, wherein the feedback unit comprises a sample circuit coupled to the switching element, the sample circuit configured to sample the current though the load and to output the sample signal.

2. The high power factor control circuit according to claim 1, wherein the switching element control module turns the switching element to an off-state according to a control signal, the control signal being configured to indicate the current flowing through the inductive element reaching the peak current.

3. The high power factor control circuit according to claim 1, the sampler circuit further configured to sample the current though the inductive element and output a first sample signal; and wherein the feedback unit further comprises a sample processor configured to generate the sample signal according to the first sample signal.

4. The high power factor control circuit according to claim 1, wherein the peak limiting signal generator further comprises a compensation module configured to produce a compensation signal from the reference signal and the sample signal.

5. The high power factor control circuit according to claim 4, wherein the compensation module comprises an error amplifier and a filter coupled to the error amplifier, the error amplifier configured to receive the reference signal and the sample signal, and to generate an error from the reference signal and the sample signal, the error being provided to the filter, the filter outputting the compensation signal.

6. The high power factor control circuit according to claim 5, wherein the peak limiting signal generator comprises a current limiting module configured to receive the compensation signal and to generate the peak limiting signal according to the compensation signal.

7. The high power factor control circuit according to claim 5, wherein the switching element control module further comprises a minimum OFF time generator configured to produce a minimum OFF time signal according to the compensation signal.

8. The high power factor control circuit according to claim 6, wherein the current limiting module comprises an amplifier and a resistor string, the amplifier comprising an output terminal, a first input terminal for receiving the compensation signal and a second input terminal coupled to the output terminal, the resistor string coupled to the output terminal and configured to output the peak limiting signal.

9. The high power factor control circuit according to claim 6, wherein the current limiting module comprises an amplifier and a resistor string, the amplifier comprising an output terminal, a first input terminal for receiving the compensation signal and a second input terminal coupled to the resistor string, and wherein the peak limiting signal is output from a node between the output terminal of the amplifier and the resistor string.

10. The high power factor control circuit according to claim 1, wherein the switching element control module comprises a logic module and a driver coupled to the logic module, the logic module configured to produce a switching signal and to provide the switching signal to the driver, thereby controlling the switching element.

11. The high power factor control circuit according to claim 2, wherein the switching element control module further comprises a delay configured to receive an ON signal and generate a further control signal for a constant-on-time mode of the AC/DC converter, the further control signal reflecting a maximum ON time for the switching element.

12. The high power factor control circuit according to claim 2, wherein the switching element control module further comprises a comparator configured to generate the control signal based on a comparison of the peak limiting signal and the sensed signal.

13. The high power factor control circuit according to claim 12, wherein the further control signal and the control signal determine an OFF control signal reflecting OFF timing for the switching element.

14. The high power factor control circuit according to claim 10, wherein the switching element control module further comprises a demagnetization detector comprising an input terminal coupled to the switching element and an output terminal configured to output a demagnetization signal to the logic module.

15. The high power factor control circuit according to claim 1, further comprising a dimming module configured to output the reference signal to the switching element control module, wherein the load is an LED lamp dimmed by the reference signal.

16. The high power factor control circuit according to claim 1, wherein the peak limiting signal varies with at least one factor selected from a group including the sample signal, the reference signal and the load.

17. A high power factor AC/DC converter, comprising:
a rectifier configured to receive AC power and to rectify the AC power into a DC current;
a converter coupled to the rectifier and configured to convert the DC current to drive power as desired by a load and to provide the drive power to the load, wherein the converter comprises an inductive element and a switching element coupled to the inductive element, the switching element configured to regulate a current flowing through the load, wherein the current flowing have ripples relative with the AC power; and
a control module comprising:
a peak limiting signal generator configured to receive a reference signal and a sample signal, the sample signal indicating the current flowing through the load, and to output at least one peak limiting signal indicating a peak current according to the reference signal and the sample signal;
a switching element control module coupled to the switching element, the switching element control module configured to control the switching element on and off, wherein the switching element control module controls the state of switching element according to the peak limiting signal and a sensed signal indicating a current flowing through the inductive element so that, within at least half a line-frequency period, a value of the ripples in the current flowing through the load is not greater than a limit value; and
a feedback unit, wherein the feedback unit comprises a sample circuit coupled to the switching element, the sample circuit configured to sample the current though the load and to output the sample signal.

18. The high power factor AC/DC converter according to claim 17, wherein the converter is selected from a group consisting of a floating buck converter, a boost converter, a flyback converter and a buck-boost converter.

19. The high power factor AC/DC converter according to claim 17, wherein the load is an LED lamp.

* * * * *